Nov. 19, 1968     D. D. DE FORD     3,412,268

ZENER DIODES BALANCING CIRCUIT

Filed June 25, 1965

INVENTOR
D. D. DE FORD

BY *Young & Quigg*

ATTORNEYS

> 3,412,268
> ZENER DIODES BALANCING CIRCUIT
> Donald D. De Ford, Evanston, Ill., assignor to Phillips
> Petroleum Company, a corporation of Delaware
> Filed June 25, 1965, Ser. No. 467,033
> 2 Claims. (Cl. 307—318)

ABSTRACT OF THE DISCLOSURE

A high sensitivity balancing circuit suitable for use with a gas chromatographic detector has Zener diodes in two of its legs, and sensing and reference thermistors in the other two legs. In another embodiment, a series of sensing and reference thermistors are connected in parallel with the Zener diodes to form a summing balancing circuit. In another embodiment, two of the legs of the balancing circuit comprise oppositely disposed Zener diodes to form an AC balancing circuit.

---

Figure 1:
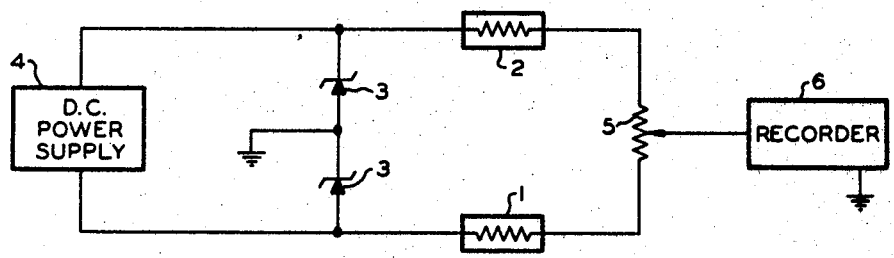

This invention relates to a balancing circuit using Zener diodes. In one aspect, this invention relates to a high sensitivity balancing circuit utilizing Zener diodes for noise rejection. In another aspect, it relates to a balancing circuit utilizing Zener diodes on two legs for common mode noise rejection. In another aspect, it relates to a summing balancing circuit with high signal to noise ratio output. In yet another aspect, it relates to a rapid sensitive detector circuit for gas chromatography. In still another aspect, it relates to a high sensitivity balancing circuit for use with alternating current. My invention will be described more fully in connection with the detector circuit of a gas chromatography analyzer.

Balancing circuits are widely used for measuring purposes because of their high sensitivity and reproducibility. In many applications, however, the limiting factor in their use is their sensitivity, or signal to noise ratio of their output signal. Arising from variations in the power supply itself or from extraneous coupling of the lead wires to ground, noise impulses are transmitted through the balancing circuit to the detector, thereby decreasing the signal to noise ratio of the circuit output. Such a problem arises in gas chromatography, for example, where the limit of the instrument's capability is determined by the sensitivity of the detector circuit. In such a situation, any improvement in the sensitivity of the balancing circuit will expand the useable range of the instrument.

By the various aspects of my invention, therefore, one or more, or other, of the following objects are obtained:

It is an object of my invention to provide a balancing circuit with improved signal to noise ratio output. It is a further object of my invention to provide a balancing circuit which rejects noise through common mode rejection. It is a further object of my invention to provide a summing balancing circuit with high signal to noise ratio output. It is still another object of my invention to provide a rapid, sensitive detector circuit for gas chromatographic instruments.

These and other objects are obtained by using the constant voltage characteristics of the Zener diodes in two legs of a balancing circuit. Zener diodes, operating under loaded conditions, have the property of maintaining a constant voltage drop despite variations in the current flowing through them. By using matched Zener diodes in two legs of a balancing circuit, I am able to effect a common mode rejection of noise with an attendant increase in signal to noise ratio in the circuit output. In one embodiment of my invention, the balancing circuit is used to provide a rapid, highly sensitive detector circuit for a gas chromatograph. In another embodiment, I provide a circuit for summing the responses of several sensing resistors. In another embodiment, I provide a balancing circuit for use with alternating current.

The method of operation of my invention may readily be seen by reference to the drawings.

Figure 2:
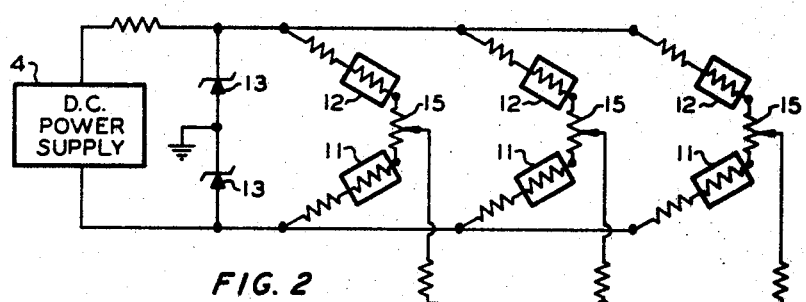
Figure 3:
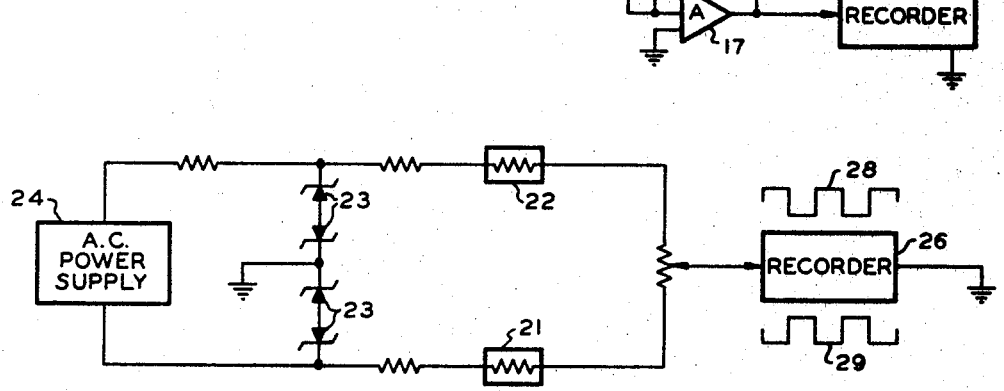

FIGURE 1 is a simple thermistor balancing circuit.
FIGURE 2 is a summing circuit.
FIGURE 3 is an embodiment of my invention employing alternating currents.

A simple circuit illustrative of the type which may be used for gas chromatographic detectors is shown in FIGURE 1. The resistance of sensing thermistor 1 is to be compared to that of reference thermistor 2, and any differences between the two to be translated into an intelligible signal. The two thermistors are connected in series to form two legs of a balancing bridge, while a pair of matched Zener diodes comprise the other two legs of the bridge. The two Zener diodes are in series with each other, and in parallel with the two thermistors. The common junction of the two Zener diodes is maintained at ground potential. Because of the constant voltage characteristics of the Zener diodes, they will provide common mode rejection of noise impulses, and will effectively protect the thermistors from any noise impulses arising in the power supply 4 or arising from the extraneous coupling of the lead wires to ground. A highly stable signal will, therefore, be transmitted through impedance matching potentiometer 5 and into the recorder 6, which may be any type suitable for the purpose intended.

FIGURE 2 shows an embodiment of my invention which is suitable for summing the outputs of several thermistor pairs. In this embodiment, one pair of Zener diodes 13 is common to several balanced circuits. The sensing thermistors 11 and reference thermistors 12 form individual balanced circuits along with the common Zener diodes. Fixed resistors are placed in series with each thermistor to limit the current flow therein since the thermistors are inherently not current limiting. The high signal to noise ratio of the output signals of each set of thermistors makes it possible to sum and amplify the signals coming from them. The signal from each branch of the circuit passes through impedance matching potentiometers 15 and then through identical paths to amplifier 17, which is provided with a feedback sensitivity control. The amplified signal is then fed to the recorder 16.

My invention may also be used as a balanced circuit for use with alternating currents as shown in FIGURE 3. In this embodiment, opposed Zener diodes are used in each of two legs of the balanced circuit so that the constant voltage characteristic is effective in both directions. The sensing and reference thermistors are designated as 21 and 22, respectively. Fixed resistors are placed in series with each thermistor. The Zener diodes serve to clip AC signal from power supply 24, giving a wave form as shown at 28 and 29. When the bridge is in balance, the output of the circuit is zero. When out of balance, there will be change of phase of the clipped signals due to change in resistance of one of the thermistors, which will be indicated by a recorder 26. A conventional phase detector circuit is used in recorder 26 circuit.

While I have chosen to describe my invention in connection with thermistor circuits suitable for gas chromatographic detection, it must be realized that this application is illustrative only, and it is not to be construed as limiting my invention thereto.

Reasonable variation and modification is possible within the scope of my invention, the essence of which is that Zener diodes are used as two legs of a balancing circuit to provide high sensivity and common mode noise rejection.

I claim:

1. An alternating current balancing circuit containing four legs, each of two legs comprising a pair of opposed matched Zener diodes in series, said two legs being in series with each other across an impressed AC voltage, the other two legs comprising sensing and reference resistances, said other two legs being in series with each other and in parallel with the aforesaid two legs, and a recorder adapted to indicate a change of phase of clipped signals produced by said circuit responsive to a change in said sensing resistance.

2. A gas chromatographic detector balancing circuit comprising two matched Zener diodes in series with each other across an impressed voltage, and gas chromatographic sensing and reference thermistors in series with each other and in parallel to the Zener diodes, and a means for detecting potential differences between the common junction of two thermistors and the common junction of the Zener diodes.

References Cited

UNITED STATES PATENTS

| | | | |
|---|---|---|---|
| 3,062,039 | 11/1962 | Ayers | 73—23.1 |
| 3,101,606 | 8/1963 | Roof | 73—23.1 |
| 2,945,950 | 7/1960 | Midkiff | 307—88.5 X |
| 3,150,332 | 9/1964 | Norris | 307—88.5 X |
| 3,250,991 | 5/1966 | Beeston | 324—62 |
| 3,263,092 | 7/1966 | Knauss | 307—88.5 |

ARTHUR GAUSS, *Primary Examiner.*

BERNARD P. DAVIS, *Assistant Examiner.*